United States Patent [19]

Beyrouty

[11] Patent Number: 4,981,097
[45] Date of Patent: Jan. 1, 1991

[54] ON-BOARD OIL SPILL PREVENTION AND RECOVERY SYSTEM

[76] Inventor: Louis Beyrouty, 88 Robin Dr., Mercerville, N.J. 08619

[21] Appl. No.: 484,977

[22] Filed: Feb. 26, 1990

[51] Int. Cl.$^5$ .............................................. B63B 43/16
[52] U.S. Cl. ................................. 114/228; 114/74 R; 114/227; 210/242.4; 210/924
[58] Field of Search ...................... 114/74 R, 227, 228; 210/242.4, 924

[56] References Cited

U.S. PATENT DOCUMENTS

| | | | |
|---|---|---|---|
| 4,102,789 | 7/1978 | Young | 210/242.4 |
| 4,111,813 | 9/1978 | Preus | 210/924 |
| 4,172,039 | 10/1979 | Akiyama | 210/242.4 |
| 4,249,834 | 2/1981 | Bouvier | 114/74 R |
| 4,301,006 | 11/1981 | Davis | 114/74 R |

Primary Examiner—Sherman Basinger
Assistant Examiner—Thomas J. Brahan
Attorney, Agent, or Firm—William L. Muckelroy; Iman Abdallah

[57] ABSTRACT

An on-board oil spill prevention and recovery system for an oil transporting vessel. The system includes a pillow storage container which releasably houses a plurality of sorbent pillows. The container is fixedly attached to said vessel above a hole cut in the deck of the vessel above an oil holding tank thereby permitting the pillows to be selectively released to the interior of the holding tank. The system further includes a sorbent boom selectively deployable in the waters surrounding the vessel.

7 Claims, 4 Drawing Sheets

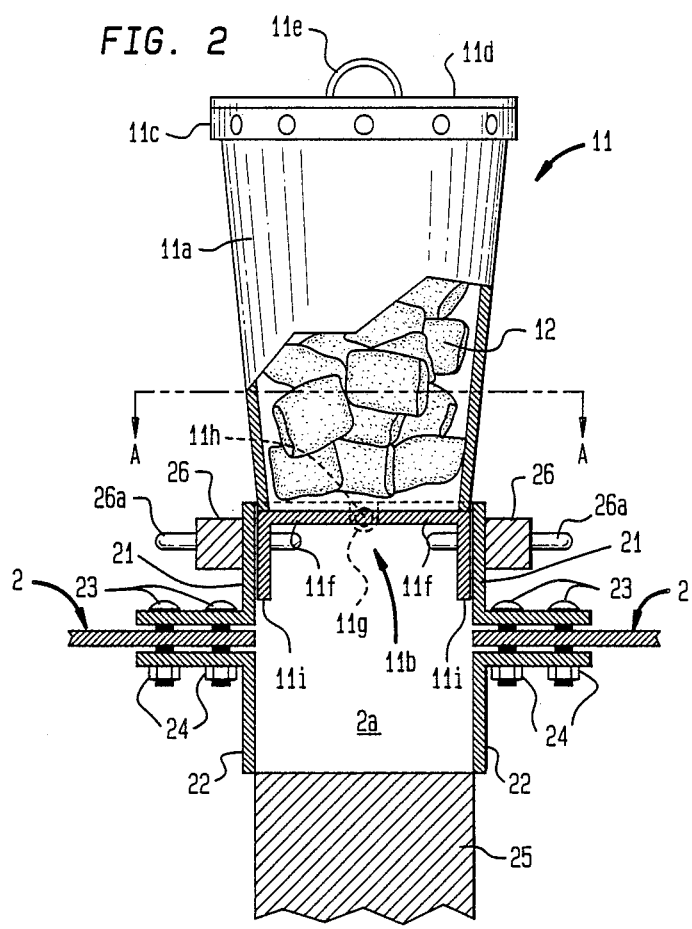
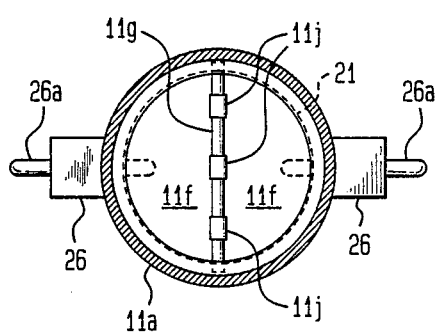
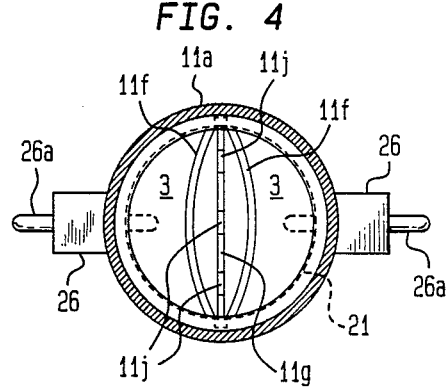

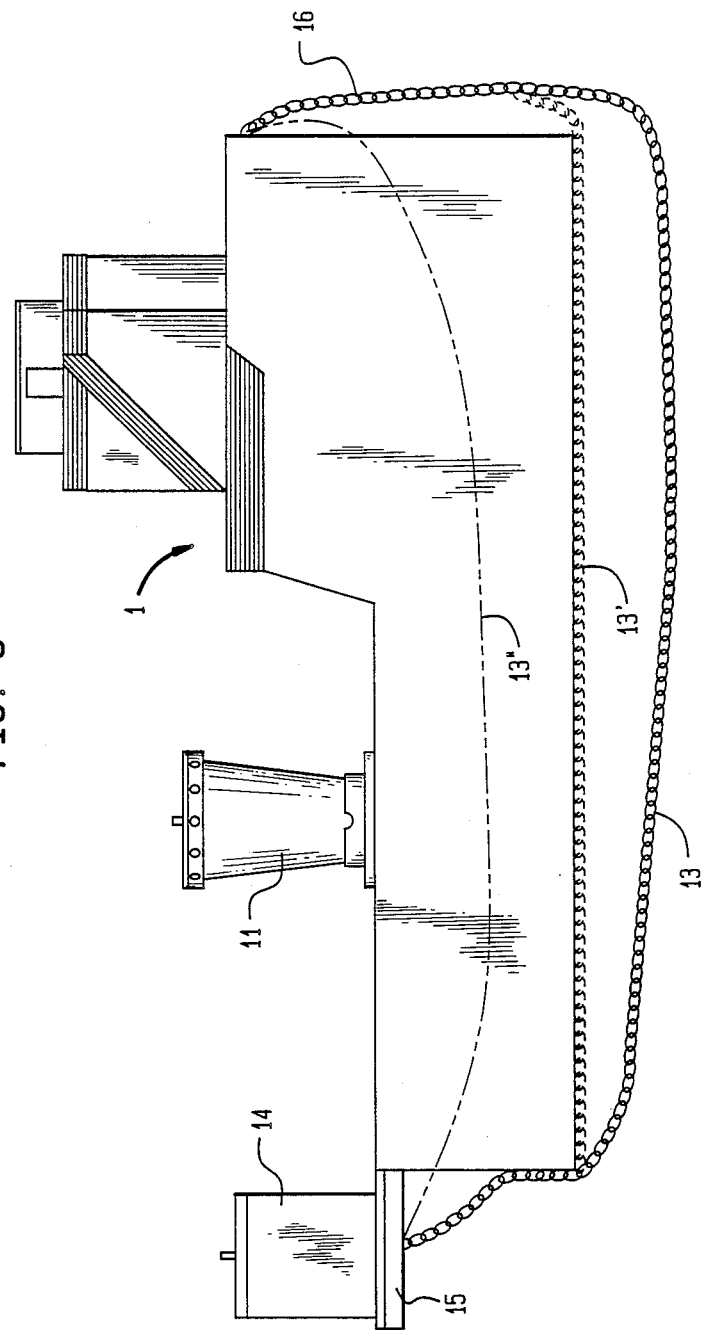

4,981,097

ON-BOARD OIL SPILL PREVENTION AND RECOVERY SYSTEM

BACKGROUND OF THE INVENTION

The present invention generally relates to means for preventing and recovering oil spills. More specifically, the present invention relates to an oil transporting vessel on-board means of preventing the escape of oil from a ruptured oil holding tank in combination with means of recovering from the surrounding waters oil that does escape the holding tank.

The huge equipment and environmental costs associated with oil spills on a body of water are widely recognized. No oil transporting vessel on-board means to prevent or recover spilled oil has been identified by the Applicant but various spilled oil recovery devices and systems are known in the prior art. The systems of the prior art generally involve large booms of sorbent material or sorbent devices or structures which are floated on the surface of the contaminated water to contain and/or remove the oil from the water. On-board precautionary measures for emergency response to a potential or actual oil spill are notably absent from the prior art. In U.S. Pat. No. 3,617,566 to Oshima et al. an oil-adsorbing structure is disclosed comprising in combination atactic, noncrystalline polypropylene adsorbent and an adsorbent carrier. In U.S. Pat. No. 3,904,528 to Yocum a structure for picking up liquid, oily contaminants from the surface of a body of water comprising an outer container of porous material pervious to liquid, oily contaminant and a spongy absorber disposed within the outer container is disclosed. In U.S. Pat. No. 4,211,659 to Nyfeldt et al. a spilled oil collecting device which is towed through the water by a vessel is disclosed, the collecting device comprising two upright, floating contaminant guide walls which converge to a contaminant collecting means. U.S. Pat. No. 3,702,657 to Cunningham et al. discloses an oil spill containment and removal device comprising a series of spaced apart cages interconnected by liquid impervious flexible membranes to form an articulated boom. Absorbent buoyant material is disposed in each cage to remove oil from contaminated water that passes therethrough. In U.S. Pat. No. 4,381,994 to Ayers a floating oil skimming device that is deployable alongside a work boat and towed thereby is disclosed for response to oil spills occurring in remote areas.

As can be understood from the foregoing, there remains a need in the art for oil transporting vessel on-board means to prevent and recover oil spills. On-board systems of oil spill prevention and recovery permit faster response to potential and actual oil spills, particularly in remote areas, and increase the probability of limiting environmental damage.

SUMMARY OF THE INVENTION

The present invention discloses an oil spill prevention and recovery system that is fixedly attachable to an oil transporting vessel thereby providing means for immediate response to a potential or actual oil spill. The prevention and recovery system herein disclosed includes a pillow storage container having a plurality of oil sorbent pillows stored therein which are selectively releasable from the storage container to the interior of an oil holding tank of the vessel, and a sorbent boom stored within a boom storage container disposed at the stern or bow of the vessel, said boom being deployable in the water surrounding the vessel by means of a boom winch deployment assembly.

An object of the present invention is to provide an on-board oil spill prevention and recovery system for an oil transporting vessel.

Another object of this invention is to provide means for immediate response to oil spills in remote areas.

A further object of the present invention is to provide means to prevent a potential oil spill in combination with means to recover oil actually spilled into the body of water surrounding an oil transporting vessel.

Another object of the present invention is to provide means for oil spill prevention which can be variably sized based on the dimensions of the transporting vessel and the quantity of oil being transported.

The present invention also provides means for oil spill prevention that can be removably interchanged in part or in toto between oil transporting vessels.

It is also an object of the present invention to provide means for retention of oil within a ruptured holding tank.

A further object of this invention is to provide an oil spill containment barrier that retains leaching or spilled oil within the immediate vicinity of a vessel.

These and other objects and advantages of the oil spill prevention and recovery system of the present invention will be apparent to those skilled in the art from the following description of a preferred embodiment, claims and appended drawings.

BRIEF DESCRIPTION OF THE DRAWINGS

FIG. 2 is an enlarged side plan view of the pillow storage container of the present invention shown partially in cross-section.

FIG. 3 is a cross-sectional view taken along line A-A of FIG. 2 showing the detachable floor of the pillow storage container in its engaged position.

FIG. 4 is a cross-sectional view taken along line A-A of FIG. 2 showing, the detachable floor of the pillow storage container in its detached position.

FIG. 6 is a side plan view of a second preferred embodiment of the boom deployment assembly of the present invention.

DESCRIPTION OF A PREFERRED EMBODIMENT

Figure 1:
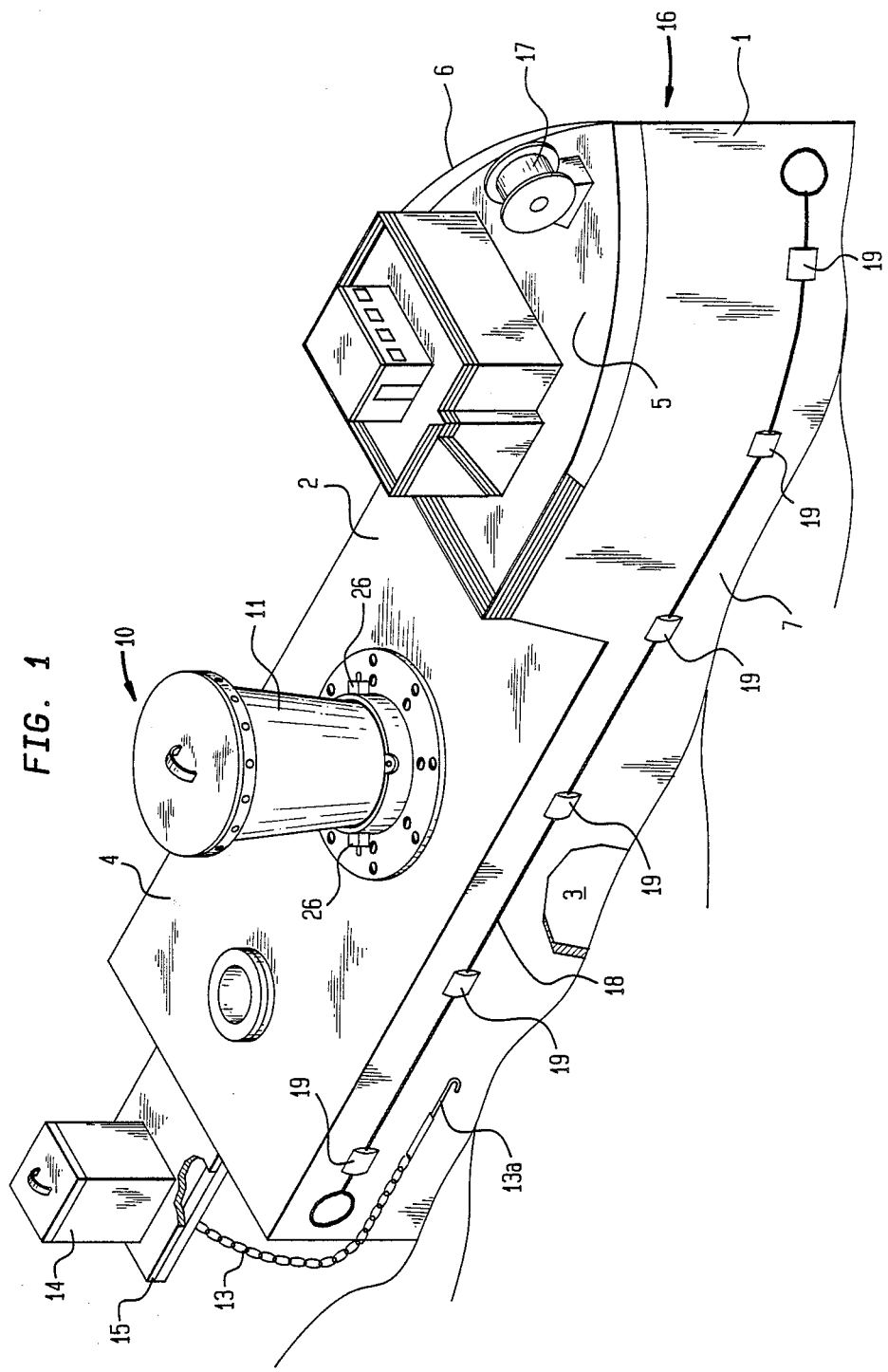
FIG. 1 is a perspective view of an oil transporting vessel equipped with the oil spill prevention and recovery system of the present invention.

FIG. 1 illustrates in a perspective view an oil transporting vessel 1 equipped with the oil spill prevention and recovery system 10 of the present invention. The prevention and recovery system 10 generally comprises a pillow storage container 11 fixedly attached to the deck 2 of the vessel 1 above an oil holding tank 3 of the vessel 1, said container 11 having a selectively detachable floor 11b (FIG. 2); a plurality of pillows 12 disposed within said storage container 11 (FIG. 2); a sorbent pillows 12 disposed within said storage container 11 (FIG. 2); a sorbent boom 13 releasably disposed within a boom storage container 14 that is fixedly attached to a boom platform 15 extending from the stern 4 of the vessel 1; and a boom deployment assembly 16 which includes a boom winch 17 disposed at the bow 5 of the vessel 1 and a pair of deployment cables 18 respectively disposed on the port 6 and starboard 7 sides of the vessel 1 by means of a plurality of break-away clamps 19. The preferred embodiment of the prevention and recovery system 10 is shown having the boom storage container 14 disposed at the stern 4 of the vessel and the winch 17 disposed at the bow 5 of the vessel 1, but their locations may be reversed. It is sufficient for purposes of the present disclosure only that the boom storage container 14 and the winch 17 be located at opposite ends of the vessel 1.

Referring now to FIG. 2, the attachment of the pillow storage container 11 to the deck 2 of the vessel 1, and the means for selectively detaching the floor 11b of container 11 can be seen in greater detail. Pillow storage container 11 generally comprises a hollow, truncated-cone-shaped container body 11a having a container body lip 11c circumscribing the top of said container body 11a, and a container lid 11d removably disposable adjacent to said container body lip 11c. A loop handle 11e is integrally formed at the center of said lid 11d. The container body 11a and the container lid 11d are preferably formed from a lightweight material, for examples, Fiberglas, polyvinylchloride or lightweight aluminum. The loop handle 11b is provided to facilitate placement and transport of the container 11 by a crane, helicopter and the like. As previously noted, a plurality of sorbent pillows 12 are stored within the body 11a of said container 11 and are selectively released to the oil holding tank 3 by operation of the detachable container floor 11b as hereinafter described in greater detail.

Pillow container mounting flanges 21, 22 are respectively disposed above and below the deck 2 of the vessel 1 for mounting of the container 11 to said deck. The container 11 is mounted above a hole 2a cut into the deck 2 and the mounting flanges 21, 22 circumscribe the hole 2a in vertical alignment with the outer surface of the container 11. A top mounting flange 21 having an L-shaped cross-section is mounted on the top surface of the deck 2 and a bottom mounting flange 22 likewise having an L-shaped cross-section is mounted adjacent to the bottom surface of the deck 2. A plurality of threaded mounting bolts 23 extend through the horizontally extending leg of the top flange 21, the deck 2 and the horizontally extending leg of the bottom flange 22 and are secured in place by bolt nuts 24 complementarily threaded with the threads of said bolts 23. A flexible tube collar 25 is fixedly attached to the vertical leg of the bottom flange 22 and extends therefrom to the interior of the holding tank 3 of the vessel 1.

The detachable floor 11b of said container 11 is held in its engaged position by releasable locking means such as solenoid locking pin means 26 disposed on the outer surface of the vertically extending leg of the top mounting flange 21 and having a locking pin 26a which extends through the vertical leg of said top mounting flange 21 to engage the floor 11b of container 11. In the preferred embodiment of the container 11, as can be seen in FIG. 2, the container floor 11b is formed by two flanged semi-circled halves 11f which are rotatably attached to each side of a floor bar 11g by means of bar straps 11j. The lower edge of the container body 11a is formed having vertically extending bar support tabs 11h in horizontal alignment on opposite sides of container 11 to which the floor bar 11g is mounted by engaging holes formed therein. The flange 11i of each semi-circled half 11f is disposed vertically adjacent to the interior surface of the vertical leg of the top mounting flange 21. The locking pin 26a engages the floor flange 11i when the floor 11b is disposed in its engaged position.

FIGS. 3 and 4 respectively illustrate in top plan views the engaged and detached positions of the container floor 11b. In the engaged position the halves 11f of the container floor 11b are held upright by the locking pins 26a. The solenoid locking pin means 26 are preferably activated by a remote emergency pull station (not shown) located on the bridge of the vessel 1. Upon activation of said locking pin means 26 the locking pins 26a are broken to release the halves 11f of the container floor 11b to fall downwardly and thereby permit the stored pillows 12 to fall into the holding tank 3 by the force of gravity.

The sorbent pillows 12 are preferably formed from an oil absorbent material that is impervious to water. The size and shape of said pillows 12 may vary and said pillow storage container 11 may be pressurized to facilitate the storage of a greater number of pillows 12 and the disbursement of said pillows 12 to said holding tank 3. Furthermore, the preferred embodiment has been described having sorbent pillows 12 disposed in said container 11 but the scope and spirit of the present invention envisions the use of any sorbent material capable of being dispersed into the holding tank 3, for example adsorbent pellets.

Figure 5:
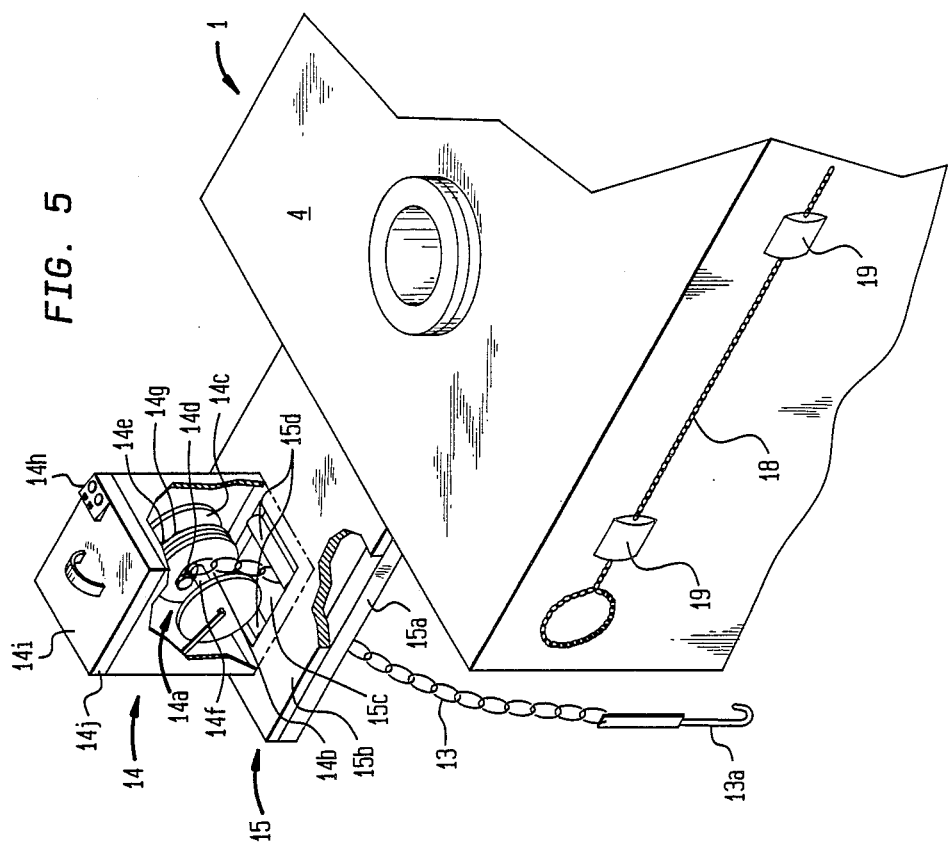
FIG. 5 is a perspective view of the boom container of the present invention.

In the event of a substantial rupture of a holding tank 3 of an oil transporting vessel 1, on-board means must be provided to recover any sorbent pillows 12 escaping through the rupture. Furthermore, oil that escapes before being noticed must also be retained within the immediate confines of the vessel to protect the environment. The sorbent boom 13 and the boom deployment assembly 16 of the present system 10 address this problem. Referring now to FIG. 5 there is shown an enlarged, partially fragmented perspective view of the boom container 14 and boom container platform 15. Boom container platform 15 generally comprises a platform frame 15a having a flat surface plate 15b fixedly attached to the top surface of said frame 15a. Boom container platform 15 is fixedly attached to the stern 4 of the vessel 1. A boom opening 15c is formed in said surface plate 15b below said boom container 14 and paired roller guides 15d, preferably formed from stainless steel, are rotatably attached to said plate 15b in spaced relationship within said opening 15c. The boom container 14 is fixedly attached to the top surface of said plate 15b. Boom container 14 is substantially a quadrilateral housing member having a rotatable spindle 14a disposed therein. In the preferred embodiment the rotatable spindle 14a is formed having separate first and second rotatable spools 14b, 14c adjacently disposed. Respective spool pegs 14d, 14e extend vertically from the spool axes 14f, 14g for receipt of the end of an absorbent boom 13 disposed therein. Roller guides 15 similar to those provided for said platform 15 are likewise disposed in the boom container opening 14f. The rotatable spools 14 are operable by means of electrical circuitry as known in the prior art which is disposed in the upper portion of the boom container 14, said circuitry being selectively operated by means of a control panel 14h disposed on the top wall 14i of said boom container 14. Said control panel 14h may alternatively be located remotely from said boom container 14, for example on the bridge of the vessel 1. The top 14j of the boom container 14 is removable for maintenance and repair of the circuitry disposed therein. The absorbent boom 13 is formed with a telescopic hook 13a fixedly attached at its distal end, said hook 13a being provided to attach to the respective cables 18 disposed along the sides of the vessel 1 as hereinafter described in greater detail. Said absorbent boom 13 extends from the spindle 14a through said platform opening 15c. The roller guides 15d facilitate sliding of the boom cable 13 during deployment.

Operation of the oil spill prevention and recovery system 10 of the present invention can be best understood by the following description of a typical scenario which references FIGS. 1–5. In the event of a holding tank 3 rupture, the sorbent pillows 12 are immediately released to the interior of the holding tank by operation of the solenoid locking means 26. The breakage of the solenoid locking pins 26a detach the floor 11b of container 11 and the pillows 12 fall therethrough. Any oil that has escaped the vessel 1 to the surrounding waters is retained and absorbed by the sorbent boom 13 disposed in said boom storage container 14. Said sorbent boom 13 is deployed to the surrounding waters by first engaging the telescopic hook 13a of said boom 13 with the end of a cable 18. Which cable 18 is selected for deployment depends on the location of the rupture and the drift of the surrounding waters. The opposite end of the cable 18 is then attached to the winch 17. By operation of the winch 17 the cable 18 is pulled from the break-away clamps 19 falling into the surrounding waters. As the cable 18 is wound onto the winch 17 the sorbent boom 13 falls into the surrounding waters thereby retaining the spilled oil.

FIG. 6 illustrates in a side plan view a second preferred embodiment of the boom deployment system 16 of the present invention. In this embodiment the cable 13 is interconnected between two boom storage containers 14 as heretofore described respectively disposed at opposite ends of the vessel 1. Each of said containers 14 are individually controlled. The fully deployed position is indicated by 13; the in-port position is indicated by 13'; the fully nested position is indicated by 13". The boom 13 is retained in each of these various positions by operation of the respective boom containers 14. The in-port position 13' provides means to collect oil and fuel that leaches through the bilge pumps and oil holding tanks of the vessel 1 while docked. When the vessel 1 is traveling the boom 13 is held in its fully nested position 13", and the fully deployed position 13 is utilized in response to an oil spill as heretofore described. The second preferred embodiment of the boom deployment assembly shown in FIG. 6 eliminates the need for the cables 18 and break-away clamps 19 previously described for the first preferred embodiment of the present system 10.

While particular embodiments of the present invention have been shown and described, it should be understood that various changes and modifications to the oil spill prevention and recovery system as disclosed herein may be made without departing from the spirit and scope of the invention and such changes and modifications are included as held in the appended claims.

Therefore in view of the foregoing, I claim:

1. An on-board oil spill prevention and recovery system for an oil transporting vessel comprising
   a pillow storage container;
   a plurality of sorbent pillows disposed in said pillow storage container;
   means to selectively release said pillows from said container to the interior of an oil holding tank of said vessel;
   a sorbent boom; and
   means to deploy said sorbent boom into the waters surrounding the vessel.

2. An on-board oil spill prevention and recovery system as described in claim 1 wherein said means to selectively release said pillows comprises a selectively detachable container floor.

3. An on-board oil spill prevention and recovery system as described in claim 2 wherein said container floor is selectively detachable by means of releasable locking means.

4. An on-board oil spill prevention and recovery system as described in claim 3 wherein said locking means comprises solenoid locking pin means.

5. An on-board oil spill prevention and recovery system for an oil transporting vessel comprising, in combination,
   a pillow storage container fixedly attached to the deck of said vessel in vertical alignment with an opening formed in said deck above an oil holding tank of the vessel, said container having a selectively detachable floor;
   a plurality of oil sorbent pillows disposed within said storage container, said pillows being selectively releasable to the interior of the oil holding tank of said vessel by detachment of the floor of said pillow storage container;
   a boom container platform fixedly attached to an end of said vessel;
   a boom storage container fixedly attached to said boom container platform;
   a sorbent boom releasably disposed within said boom storage container; and
   a boom deployment assembly including a boom winch and a pair of deployment cables, said cables being respectively and releasably disposed on the port and starboard sides of the vessel and said boom winch being fixedly attached at the opposite end of the vessel from said boom container platform.

6. An on-board oil spill prevention and recovery system as described in claim 5 wherein said boom deployment assembly comprises a pair of separately controlled boom storage containers disposed at opposite ends of said vessel having means to selectively wound said boom therein, said sorbent boom being interconnected between said boom storage containers.

7. An on-board oil spill prevention and recovery system for an oil transporting vessel comprising, in combination,
   a pillow storage container fixedly attached to the deck of said vessel in vertical alignment with an opening formed in said deck above an oil holding tank of the vessel, said container having a selectively detachable floor;
   a plurality of oil sorbent pillows disposed within said storage container, said pillows being selectively releasable to the interior of the oil holding tank of said vessel by detachment of the floor of said pillow storage container;
   a boom container platform fixedly attached to an end of said vessel;
   a boom storage container fixedly attached to said boom container platform;
   a sorbent boom having one end thereof fixedly attached to the end of said vessel opposite to said boom container platform and the opposite end thereof releasably disposed within said boom storage container.

* * * * *